US012645993B2

(12) United States Patent
Watanabe

(10) Patent No.: US 12,645,993 B2
(45) Date of Patent: Jun. 2, 2026

(54) MACHINE LEARNING TO ADAPT EXTRACTION TO DIFFERENT DOCUMENTS

(71) Applicant: Kaoru Watanabe, Sunnyvale, VA (US)

(72) Inventor: Kaoru Watanabe, Sunnyvale, VA (US)

(73) Assignee: Ricoh Company, Ltd., Tokyo (JP)

( * ) Notice: Subject to any disclaimer, the term of this patent is extended or adjusted under 35 U.S.C. 154(b) by 642 days.

(21) Appl. No.: 18/118,994

(22) Filed: Mar. 8, 2023

(65) Prior Publication Data

US 2024/0303531 A1 Sep. 12, 2024

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | | |
|---|---|---|---|---|
| 10,489,645 B2 * | 11/2019 | Wyle | ................... | G06V 30/414 |
| 11,232,300 B2 * | 1/2022 | Wyle | ................... | G06V 30/416 |
| 11,238,313 B2 * | 2/2022 | Rezvani | ................... | G06F 18/24 |
| 11,443,212 B2 * | 9/2022 | Kishimoto | ............. | G06N 5/013 |
| 11,620,843 B2 * | 4/2023 | Torres | ................... | G06F 18/214 |
| | | | | 382/176 |
| 11,625,934 B2 * | 4/2023 | Tiyyagura | ............. | G06F 40/295 |
| | | | | 382/112 |
| 11,715,318 B2 * | 8/2023 | Cahn | ................... | G06V 30/416 |
| | | | | 382/176 |
| 11,741,735 B2 * | 8/2023 | Brown | ................... | G06T 1/0021 |
| 11,868,717 B2 * | 1/2024 | Ho | ................... | G06F 40/226 |
| 11,919,042 B2 * | 3/2024 | Blohm | ................... | G06F 40/30 |
| 11,921,795 B2 * | 3/2024 | Patton | ................... | G06F 3/0486 |
| 12,056,331 B1 * | 8/2024 | Benson | ................... | G06F 40/106 |
| 12,271,834 B2 * | 4/2025 | Bly | ................... | G06F 40/30 |
| 2021/0295103 A1 * | 9/2021 | Tanniru | ................... | G06V 10/82 |

OTHER PUBLICATIONS

Hu et al. "Automatic Extraction of Titles from General Documents using Machine Learning", 2005 ACM, pp. 145-154.*

Surana et al. "Text Extraction and Detection from Images using Machine Learning Techniques: A Research Review", 2022 IEEE, pp. 1201-1207.*

Barrio et al. "Reel: A Relation Extraction Learning Framework", 2014 IEEE, 2 pages.*

* cited by examiner

*Primary Examiner* — Maikhanh Nguyen

(74) *Attorney, Agent, or Firm* — Hickman Becker Bingham Ledesma LLP

(57) ABSTRACT

Techniques for adapting extraction to different documents using machine learning are provided. In one technique, multiple parsing rules are stored, each parsing rule being used to map field values in extracted text to field names associated with the parsing rule. In response to receiving a request to use a parsing rule for a particular document, a particular parsing rule is selected from among the parsing rules. Text data associated with the particular document is extracted. The particular parsing rule is used to map field values (in the extracted text data) to field names associated with the particular parsing rule. First input that selects data associated with a particular field name of the field names is received. Second input that selects a visual portion of the particular document is also received. The particular parsing rule is updated based on the first and second inputs to generate an updated parsing rule.

20 Claims, 13 Drawing Sheets

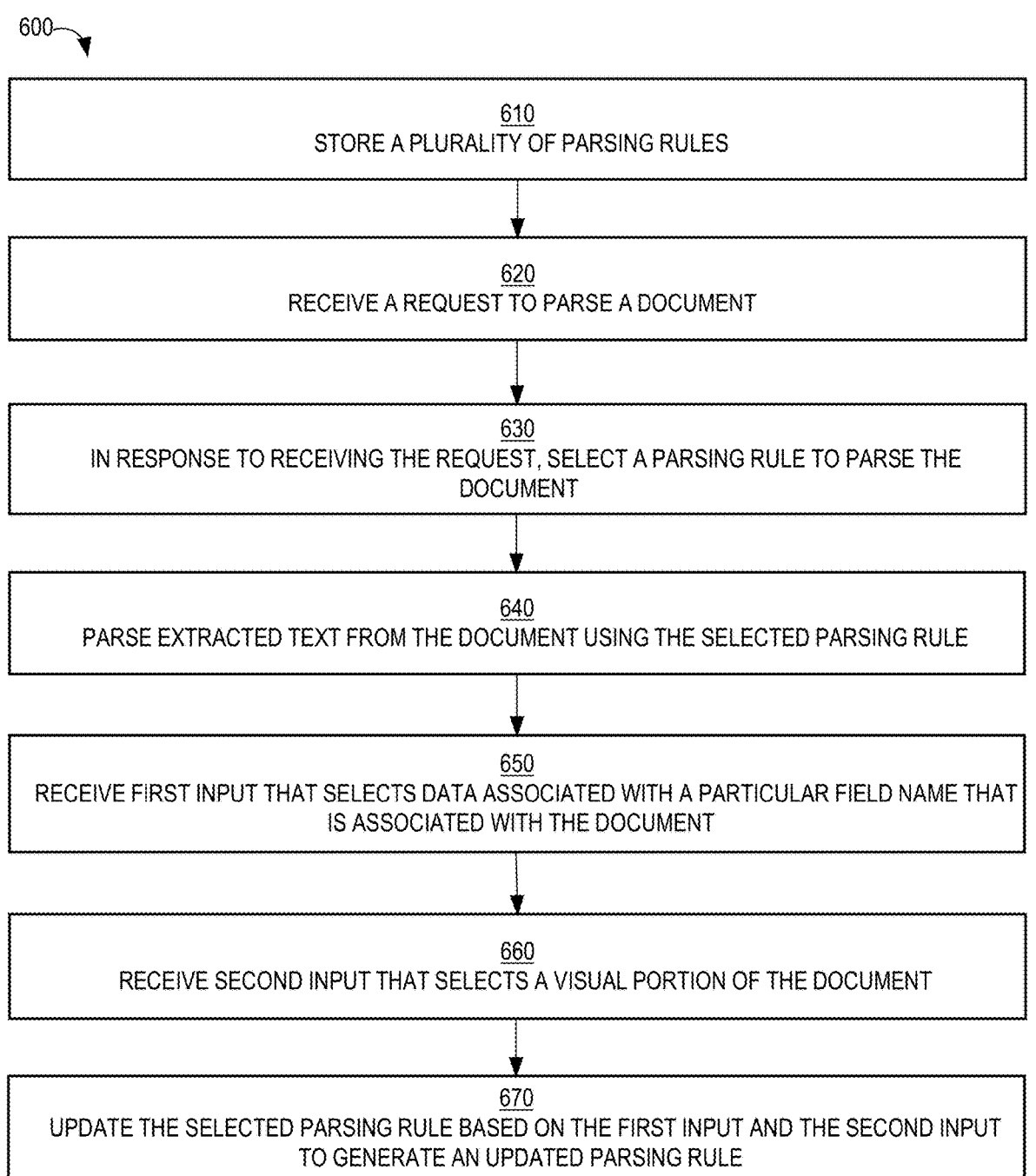

600

610
STORE A PLURALITY OF PARSING RULES

620
RECEIVE A REQUEST TO PARSE A DOCUMENT

630
IN RESPONSE TO RECEIVING THE REQUEST, SELECT A PARSING RULE TO PARSE THE DOCUMENT

640
PARSE EXTRACTED TEXT FROM THE DOCUMENT USING THE SELECTED PARSING RULE

650
RECEIVE FIRST INPUT THAT SELECTS DATA ASSOCIATED WITH A PARTICULAR FIELD NAME THAT IS ASSOCIATED WITH THE DOCUMENT

660
RECEIVE SECOND INPUT THAT SELECTS A VISUAL PORTION OF THE DOCUMENT

670
UPDATE THE SELECTED PARSING RULE BASED ON THE FIRST INPUT AND THE SECOND INPUT TO GENERATE AN UPDATED PARSING RULE

*FIG. 6*

MACHINE LEARNING TO ADAPT EXTRACTION TO DIFFERENT DOCUMENTS

TECHNICAL FIELD

This disclosure relates generally to training an electronic document processor and, more particularly, to regression in the electronic document processing context.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Intelligent document processing (IDP) is a mature software category that automates manual document handling tasks, such as data extraction and data entry. IDP is used by many enterprise customers with centralized operations. IDP has not reached widespread adoption largely due to requiring significant capital expenditure. The capital expenditure barrier has been removed by transaction-based cloud services, such as Ricoh IBP, but widespread adoption is still hampered by a great variation within many types of documents. For example, the variance in format for invoices alone makes it difficult to train an IDP system to learn how to properly extract invoice data that originate from different vendors. While the IDP system may properly recognize some data, there is still significant manual intervention that is necessary to extract and capture all required data.

SUMMARY

The appended claims may serve as a summary. In one aspect, an apparatus is provided. The apparatus comprises a memory storing instructions which, when executed by one or more processors, cause, storing a plurality of parsing rules in a parsing rule database, each parsing rule being used to map field values in extracted text to field names associated with the parsing rule. A request to use a parsing rule, in the plurality of parsing rules, for a particular document is received. In response to receiving the request, a particular parsing rule is selected from among the plurality of parsing rules. Text data associated with the particular document is extracted. The particular parsing rule is used to map a plurality of field values in the text data to a plurality of field names associated with the particular parsing rule. First input that selects data associated with a particular field name of the plurality of field names is received. Second input that selects a visual portion of the particular document is received. The particular parsing rule is updated based on the first input and the second input to generate an updated parsing rule.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

In the figures of the accompanying drawings like reference numerals refer to similar elements.

FIG. 2A-2C are screenshots of example user interfaces for displaying automatically extracted text data of an electronic document and performing regression with respect to the document format of the electronic document, in an embodiment;

FIG. 3B is a screenshot of an example user interface that presents indications of multiple document formats and an indication for each document format regarding whether that document format is locked, in an embodiment;

FIGS. 5A-5B are screenshots of example user interfaces that allow a user to select multiple values in a document and cause performance of an aggregation operation on the selected values, in an embodiment;

FIG. 6 is a flow diagram that depicts an example process for processing an electronic document, in an embodiment;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. SYSTEM OVERVIEW
III. IDP SYSTEM
    A. PARSING RULE DATABASE
    B. DOCUMENT TYPES ASSOCIATED WITH AN ORGANIZATION
    C. DOCUMENT TYPE MATCHING PROCESS
IV. EXTRACTION INITIATION
    A. MULTIPLE PAGES
    B. MULTIPLE DOCUMENTS IN A FILE
    C. FIELD NAME-TO-VALUE MATCHING
    D. USER INTERFACE FOR DISPLAYING EXTRACTED DATA
V. LOCKING A PARSING RULE
VI. NEW ENTITY
VII. SELECTING MULTIPLE VALUES
VIII. EXAMPLE PROCESS
IX. IMPLEMENTATION MECHANISMS

I. OVERVIEW

An approach is provided for equipping machine learning with a database to store user interactions/corrections presented at a web-based application. The user corrections are accumulated with document parsing rules in a machine learning database as users verify data capture from a document (or form). One or more cycles of capturing and re-training may occur before a parsing rule for a particular entity is verified. Thus, machine learning may be performed on a per-entity basis, such as in the case of certain types of documents. This approach is useful when the training is done by a representative of an IDP system and then the result of the training is passed to a end-user customer. Embodiments improve computer-related technology, specifically in the intelligent document process field where automated data extraction and accurate capture is imperative. Improvements include the ability to modify parsing rules on a per entity basis and leveraging those modifications when documents from the same entity are processed by the IDP system.

II. SYSTEM OVERVIEW

Figure 1:
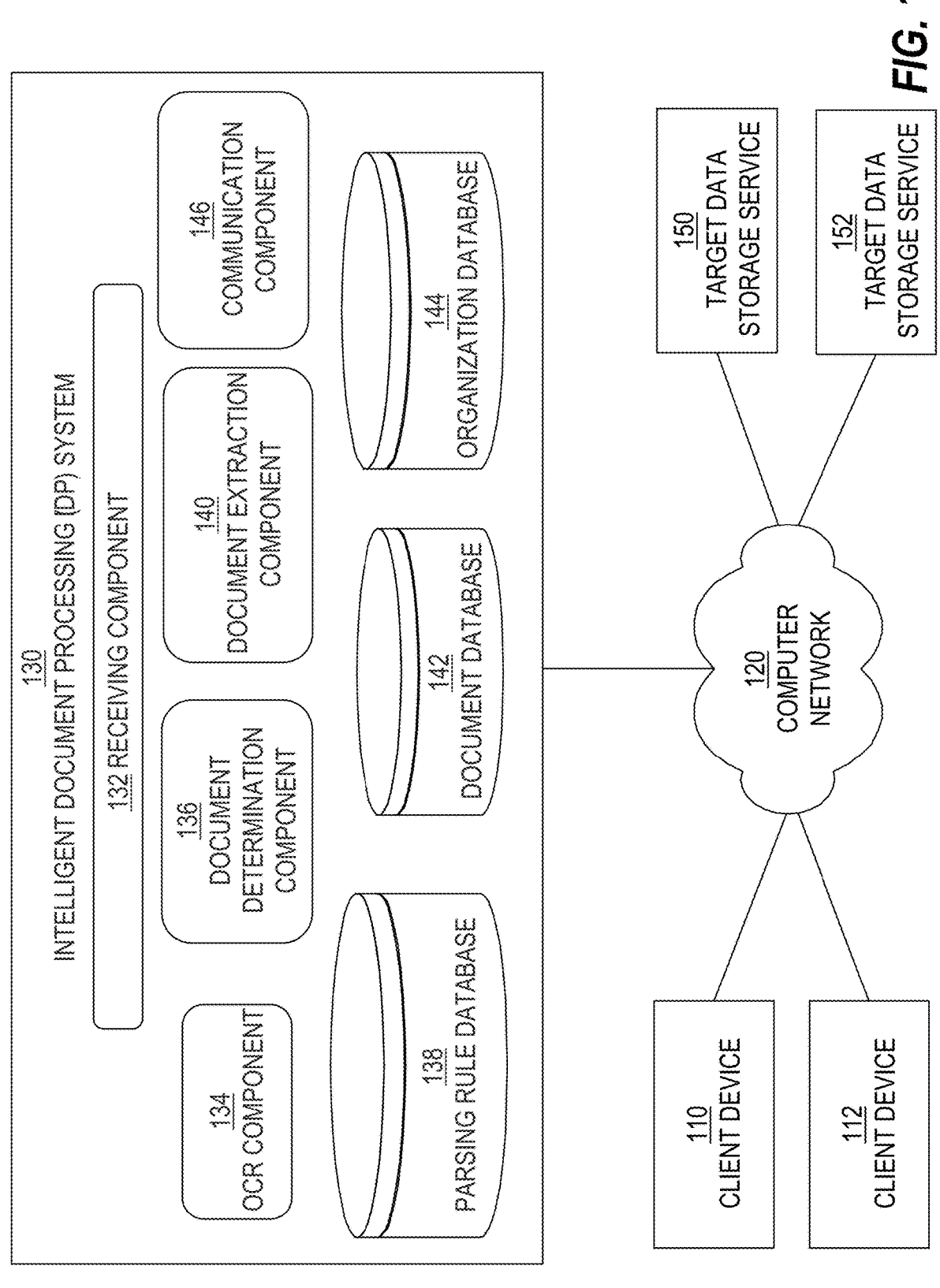
FIG. 1 is a block diagram that depicts an example system for intelligent document processing, in an embodiment.

FIG. 1 is a block diagram that depicts an example system 100 for IDP, in an embodiment. System 100 includes client devices 110-112, a computer network 120, a IDP system 130, and target data storage services 150-152. Although only two client devices are depicted, system 100 may include many client devices. Similarly, although only two target data storage services are depicted, system 100 may include more or less target data storage services.

Examples of client devices 110-112 include a smartphone, a laptop computer, a desktop computer, a tablet computer, and a multi-function peripheral (MFP). Each of client devices 110-112 hosts an application that communicates with IDP system 130 over computer network 120. The application (developed by the same entity that owns or operates IDP system 130) may be a native application that is installed on the client device or may be a web application that executes within a web browser that is installed on the client device.

Client devices 110-112 may be from the same enterprise or organization or from different enterprises or organizations. Users of client devices 110-112 may be users or representatives of the entity that owns or provides IDP system 130. For example, a user of client device 110 may be an employee of the entity that owns and operates IDP system 130. The user of client device 110 trains IDP system 130 on documents from a user of client device 112, who may be a customer of that entity; thus, leveraging the service that IDP system 130 provides in extracting data from electronic documents and storing the extracted data in one or more target data storage systems accessible to the customer.

Client devices 110-112 transmit electronic documents to IDP system 130. Client devices 110-112 may upload, to IDP system 130, in a single data transfer, a single electronic document (e.g., an image of a physical document) or multiple electronic documents of the same type or of different types. A single electronic document may comprise multiple pages.

An electronic document may be: (a) an image generated by (i) a camera integrated into a client device (e.g., a smartphone) or (ii) a scanning device that is part of an MFP; (b) a PDF that may have been included in an email from a third-party that generated the electronic document; (c) a word processing document; or (d) an email.

An electronic document has a format. The format of a document indicates how information in the document is organized, such as where certain field names and values are located on a document (e.g., horizonal offsets and/or vertical offsets from the top lefthand corner of the document) and/or where field names and/or values are located relative to other field names and/or values. For example, in one document format, an invoice number is located immediately below text that says "Invoice No." while in another document format, an invoice number if immediately to the right of text that says, "Inv. #."

The format of a document may be dictated by a third-party, such as the government, a health care provider, or a vendor that bills a customer/user of IDP system 130 for services rendered to the customer. Different documents may have very different formats, even documents from the same document type or category.

For example, there may be many different ways to format an invoice, an explanation of benefits (EOB), a purchase order, a W2, and a driver's license. Nevertheless, the type of information within documents of the same document category or type may be the same or such documents may have a common set of field names. For example, most invoices have an invoice number, an invoice date, a due date, a bill to address, and a ship to address. Similarly, most driver's licenses have the following field names: first name, last name, address, date of birth, state, eye color, height, weight, issue date, expiration date, and license class.

From vendor to vendor (in the case of invoices) and from state to state (in the case of driver's licenses), the field names may vary from one document to another within a document category. For example, one state may issue driver's licenses with a label of "Height" for height of the driver, while another state may issue driver's licenses with a label of "HGT" for height of the driver.

III. IDP SYSTEM

IDP system 130 comprises a receiving component 132, an optical character recognition (OCR) component 134, a document determination component (DDC) 136, a parsing rule database 138, a data extraction component (DEC) 140, a document database 142, an organization database 144, and a communication component 146. Each of these components may be implemented in software, hardware, or any combination of software and hardware. The following description of these components is for ease in explanation of embodiments. These components (or a subset thereof) may be implemented in the same program or process. Alternatively, the tasks performed by the same component (as described herein) may be performed by different components.

While embodiments described herein involve IDP system 130 (or components thereof) performing certain operations or tasks, embodiments are not so limited. For example, some of those operations or tasks may be performed by applications hosted on client devices 110-112, which applications are configured to communicate with IDP system 130 over computer network 120 and present data (received from IDP system 130) on screens of client devices 110-112. Thus, instead of the applications on client devices 110-112 being "dumb" by just displaying data that IDP system 130 provides, the applications may perform substantive tasks, such as an OCR operation, storing (at least temporarily) all possible field names of a document (received from IDP system 130), performing comparisons between those field names with extracted text data items, generating confidence scores, identifying low confidence field names/values, etc.

Receiving component 132 receives an electronic document and processes the electronic document. If text data has not already been extracted from an electronic document, then "processing" the electronic document involves OCR component 134 performing an OCR operation on the electronic document. Output from an OCR operation comprises extracted text and, optionally, spatial information.

Spatial information indicates where in the electronic document each extracted text data item (i.e., a character or series of continuous characters) is located in the electronic document. Spatial information may comprise one or more byte offsets (or a range of byte offsets) and/or one or more pixel offsets (or two ranges of pixel offsets; one in the horizontal direction and one in the vertical direction). Thus, each extracted text data item may be associated with distinct spatial information. Additionally or alternatively, spatial information for an extracted text data item may include logical spatial data that indicates where the extracted text data item is located relative to one or more other extracted text data items (e.g., a certain field name or field value), particularly ones that are relatively close to each other. Such logical spatial data may indicate that one extracted text data item is above or "up" relative to another extracted text data item, or that one extracted text data item is to the left of another extracted text data item.

A. Parsing Rule Database

Parsing rule database 138 stores multiple parsing rules. A parsing rule corresponds to a document with a particular format. A parsing rule comprises (1) field name data that identifies is a set of field names and (2) field value data that indicates where extracted field values for the set of field names are located in a document. Each parsing rule may be for a different document format.

Each parsing rule may be associated with a particular entity, where the particular entity is the source (or provider) of documents of the document format that corresponds to the particular rule. For example, one entity (e.g., vendor, insurance company) provides a first set of multiple documents (having the same format) over time to a customer (or user of client device 110) of IDP system 130 while another entity provides a second set of documents (having a different format than the first set of documents) over time to the same customer. The entity that provides a document to a customer (or that generated the document) is referred to as a "source entity." Thus, multiple source entities may provide their respective documents to a customer, or user of client device 110 or 112. Even source entities may be the source of documents of different formats or even different document types.

Parsing rule database 138 may be organized by document category or type, such that parsing rules pertaining to one document type are stored separately (e.g., in one table) from parsing rules pertaining to another document type (e.g., in another table). This may be useful since documents of the same document type may share many of the same field names.

A document belongs to one document type. Example document types include invoice, W-2, EOB (explanation of benefits), driver's license, and purchase order. A description of a parsing rule and a document may be represented in a record (e.g., row, object, or other data structure) in parsing rule database 138.

Each record (of a parsing rule) indicates (1) a source entity, (2) a document type, (3) a set of field names of the corresponding document, and, optionally, (4) a document format, or locations within the document of field values for the set of field names. Example field names include first name, last name, mailing address, phone number, email address, social security number, date of birth, invoice number, and policy number. The set of field names for one document may be different than the set of field names for another document, even of the same document type. The set of field names for a document is referred to as a "data set."

Each record may also indicate, for one or more of the field names of the document type, a data type value (e.g., NUMBER, DATE, STRING), an expected spatial location (that indicates where the field name and/or corresponding field value is located in the document), and/or logical spatial data that indicates where the field name and/or corresponding field value is located, in the document, relative to one or more other field names/values).

DDC 136 determines a source entity of an electronic document. This determination may be made by (1) analyzing (i) characteristics of the extracted text (e.g., a set of extracted text items) and, optionally, (ii) spatial information of the extracted text items and (2) comparing those characteristics with characteristics of known document formats. For example, the extracted text may include multiple text data items that match multiple (or most) fields names that are associated with a particular document or a particular document type. As another example, the spatial information of the extracted data items may match the spatial information of field names associated with a particular document.

A result of the comparison may be a categorical match score, such as "no match," "full match," or "partial match." Instead of such match categories, a numerical match score may be calculated, such as a percentage match. For example, a 90% match indicates that 90% of field names of a document type match extracted text data items from the electronic document in question. A match score may be based on field name matches and/or spatial information matching. The higher the match score pertaining to a document or document type, the more likely that the electronic document matches the format of the document or is of the document type.

B. Documents Associated with an Organization

If IDP system 130 supports document processing of electronic documents from multiple customer organizations, then DDC 136 may determine an organization that is associated with a received electronic document. The identity of the organization may be associated with documents in which the organization is interested. A determination of documents of an organization may be stored in parsing rule database 138 and/or organization database 144.

Organization database 144 stores data about multiple organizations, such as document data that identifies a set of documents that are used by a corresponding organization and, optionally, document type data that identifies a set of document types that are used by the corresponding organization, document identification data that identifies a set of documents that have been processed for the corresponding organization, member identification data that identifies members of the corresponding organization, and connector data that identifies a set of connectors (or target data storage services 150-152) that are used by the corresponding organization to store extracted and processed text data items that originate from processed electronic documents. Target data storage services 150-152 may be first-party data storage services or third-party data storage services ("third-party" relative to the entity that owns or manages IDP system 130 and the entity with which the user is affiliated/employed).

Thus, when processing an electronic document, DDC 136 may determine an organization that is associated with the electronic document, then look up, in organization database 144, documents and/or document types that are associated with the organization. Determination of an organization may involve determining (i) an identity of a computing device (e.g., client device 110) that provided the electronic document or (ii) an identity of a user of the computing device. The identity may be associated with the organization in member identification data in organization database 144.

In an embodiment, one or more documents or document types of an organization may be associated with access privileges. Example privileges include initiating the processing of a document, modifying a document, deleting a document, and creating a new document. Thus, some users of an organization may have one or more of these privileges while other users of the organization do not.

In an embodiment, IDP system 130 stores member training data (e.g., in parsing rule database 138) that identifies one or more members of an organization that have contributed to training IDP system 130 for a document and/or document type. Thus, different parsing rules may be associated with a different set of members. One of the members may have merely modified one field name, deleted one field name, added one field name, or changed a location of a field value. Member training data of a parsing rule may indicate when the parsing rule was created, who created the parsing rule, what modifications (if any) have been made to the parsing rule, and who initiated those modifications (if any). If a parsing rule was deleted with respect to an organization, then member training data may indicate when that deletion occurred and who initiated the deletion. Such member training data may only be accessible to certain users in an organization, such as users with a manager status.

In an embodiment, IDP system 130 stores member uploading data (e.g., in parsing rule database 138) that identifies, for each parsing rule, one or more members (or users of an organization) that are uploading documents corresponding to that parsing rule. Thus, member uploading data may be updated whenever extracted data points of a document have been successfully transmitted to a target data storage service. Member uploading data may indicate, for each document of the corresponding parsing rule, when the document was processed, which target data storage services was used, and who initiated the processing of the document. Again, such member uploading data may only be accessible to certain users in an organization, such as users with a manager status.

In an embodiment, IDP system 130 stores, for each parsing rule of an organization, data that associates the parsing rule with documents that have been processed using the parsing rule, which documents may be associated with identities of the users who initiated the processing of those documents. Thus, a user of the organization may select a parsing rule and then select an option to view the users (of an organization) who have been initiating the processing of documents corresponding to that parsing rule. This data is helpful for managers of the organization to see who has been doing the work on a per-parsing rule basis. Also, a user of the organization may select a thumbnail option associated with a parsing rule, which selection causes a view to be presented, the view including thumbnails of documents, of the selected parsing rule, that have been processed. Then, selection of a thumbnail causes an image of the electronic document to be presented on a screen of a computing device of the user.

C. Document Format Matching Process

Given a set of document formats that are associated with the identified organization, DDC 136 may perform, for each document format in the set, a comparison between characteristics of the extracted text data items and characteristics of the document format. The comparisons may stop when a match score of 100% or "full match" is calculated/determined for a document format, so that comparisons with respect to other document formats do not need to be made.

A characteristic of an extracted text data item may be a name of an entity, such as a vendor. If the name of an entity is found in the extracted text and the name of the entity is associated with a particular parsing rule in parsing rule database 138, then that parsing rule is used to assign the extracted text data items with the appropriate field names.

In the embodiment where a document format search is limited to document formats of an organization associated with the received electronic document, it may be possible that no match is found. For example, the highest match score in a set of document format may be 60% and a threshold match score may be 75%. Since the highest match score is less than the threshold match score, then DDC 136 determines that there is no document format match. In such a scenario, DDC 136 determines that the electronic document is associated with a new document format, or one that is not associated with the organization. This scenario may trigger searching document formats associated with (or used by) other organizations. Thus, DDC 136 may compare (i) characteristics of the extracted text data items and/or associated spatial information with (ii) document formats associated with other organizations. Searching document formats associated with other organizations is referred to as "federated searching," which allows documents of document formats that have never been provided by a user or organization to be processed without any additional training from the user or organization. Thus, the training IDP system 130 once for a document format by one user or organization may be leveraged by many other users or organizations.

IV. Extraction Initiation

Initiation of processing of an electronic document may occur in one of multiple ways. Initiation may involve a user of client device 110 selecting, for uploading to IDP system 130, an electronic file (i) that is stored on client device 110 (e.g., in a photo library or in a file folder) (or an external storage system to which client device 110 is connected, such as a proprietary document storage cloud service or a third-party document storage cloud service) and (ii) that contains the document. Initiation may also involve pointing a view of a camera on client device 110 toward a physical document and selecting a graphical button to take a picture of the physical document and then causing the picture (or digital image) to be uploaded to IDP system 130.

A. Multiple Pages

DDC 136 (or another component) determines whether a file (e.g., a PDF or image) from a computing device includes multiple pages. This determination may involve: (a) examining metadata associated with the file, which may indicate a number of pages; (b) analyzing the file to identify page break data; (c) examining output from the OCR operation to detect references to page numbers or common text and spacing patterns that indicate an end of page or new page; and/or (d) examining output from the OCR operation to detect a common identifier with certain characteristics on multiple pages.

B. Multiple Documents in a File

If multiple pages are detected, then DDC 136 determines whether the pages belong to the same electronic document or to different electronic documents. (Thus, a single file may include multiple electronic documents.) Such a determination may involve determining that page numbering ends or restarts and/or determining that a common identifier (e.g., a policy number or invoice number) for a previous set of pages is not found in a subsequent page. Thus, DDC 136 may determine that a file contains multiple documents of the same format or of different formats.

In an embodiment where IDP system 130 detects multiple documents (whether of the same format or different formats) in a single file, IDP system 130 presents a first option to immediately process the first document and a second option to allow the user to review the document type classification and/or document format classification of one or more of the multiple documents. User selection of the second option causes a list of names/identifiers of the detected documents and their corresponding detected document formats/types to be presented on a screen of the computing device. In addition to, or instead of, a name/identifier of a detected document, the list may include a thumbnail image of the first page of each detected document. Then, user selection of the name/identifier or thumbnail image of one of the detected documents causes a fuller view (e.g., full screen view) of the first page of the selected document may be presented on the screen. Then the user may provide input (e.g., finger swipes or audio instructions) to zoom in on the presented page and/or cause a subsequent page of the selected document to be presented on the screen. Then the user may provide one or more inputs to confirm whether the document format classification (or document type classification) of the selected document is correct.

C. Field Name-to-Value Matching

If a parsing rule is found for an electronic document, then DEC 140 uses the parsing rule to: (1) identify extracted text data items that pertain to field values, (2) identify extracted text data items that pertain to field names, and then (3) associate (i) the extracted text data items pertaining to field values with (ii) the extracted text data items pertaining to field names. The extracted text data items and the association between field values and field names are stored in association with the electronic document. This association may be used to present at least a portion (or subset) of the extracted text data items on a screen of a computing device (e.g., client device 110). Once extraction, parsing, and association have taken place, the result may be stored in document database 142. For example, each record in document database may correspond to a different electronic document that has been extracted and parsed and include the associated field name-value pairs. Also, each record may include the file (e.g., image or PDF) that includes the corresponding electronic document. Additionally or alternatively, communication component 146 transmits the associated data (and, optionally, the corresponding file) to one or more target data storage services 150-152.

The field values that have been extracted from an electronic document and correspond to the set of field names (or "data set") of the corresponding document format (and/or type) are referred to as "data points." Thus, once processed by IDP system 130, an electronic document is associated with a data set (as a result of the electronic document being associated with the corresponding document format) and data points for that data set.

In an embodiment where a new document format is discovered for a user or for an organization of the user, but the document format is "old," or has been detected before for another user or for another organization (and, thus, is known to IDP system 130), IDP system 130 may determine a "suggested data set" for the "new" document format and present the suggested data set in a user interface on a screen of the computing device of the user. A suggested data set is a data set that IDP system 130 predicts might be relevant to the user. For example, the suggested data set may be a data set that was used by another organization for the corresponding document format. This option may be used if only one other organization has processed documents pertaining to this document format. As another example, the suggested data set may be a data set that represents the intersection of multiple data sets, each pertaining to a different organization that are associated with the document format. (Alternatively, this suggested data set may be a super set of all these multiple data sets.) This option may be used if multiple organizations have requested the processing of documents pertaining to this document format.

On the other hand, a custom data set is one that has been selected by a user or organization. A portion of the custom data set may have corresponded to a suggested data set. For example, if a user is presented, in a user interface, a suggested data set and the user selects one of the field names in the suggested data set for deletion because the user (or the associated organization) is not interested in that field name, then the reduced suggested data set becomes a custom data set for the user or organization. As another example, if a user is presented, in a user interface, a suggested data set and the user, using the user interface and options found thereon for viewing additional field names extracted from the electronic document, selects one of the additional field names for insertion into the suggested data set, then the expanded suggested data set becomes a custom data set for the user or organization.

D. User Interface for Displaying Extracted Data

Figure 2A:
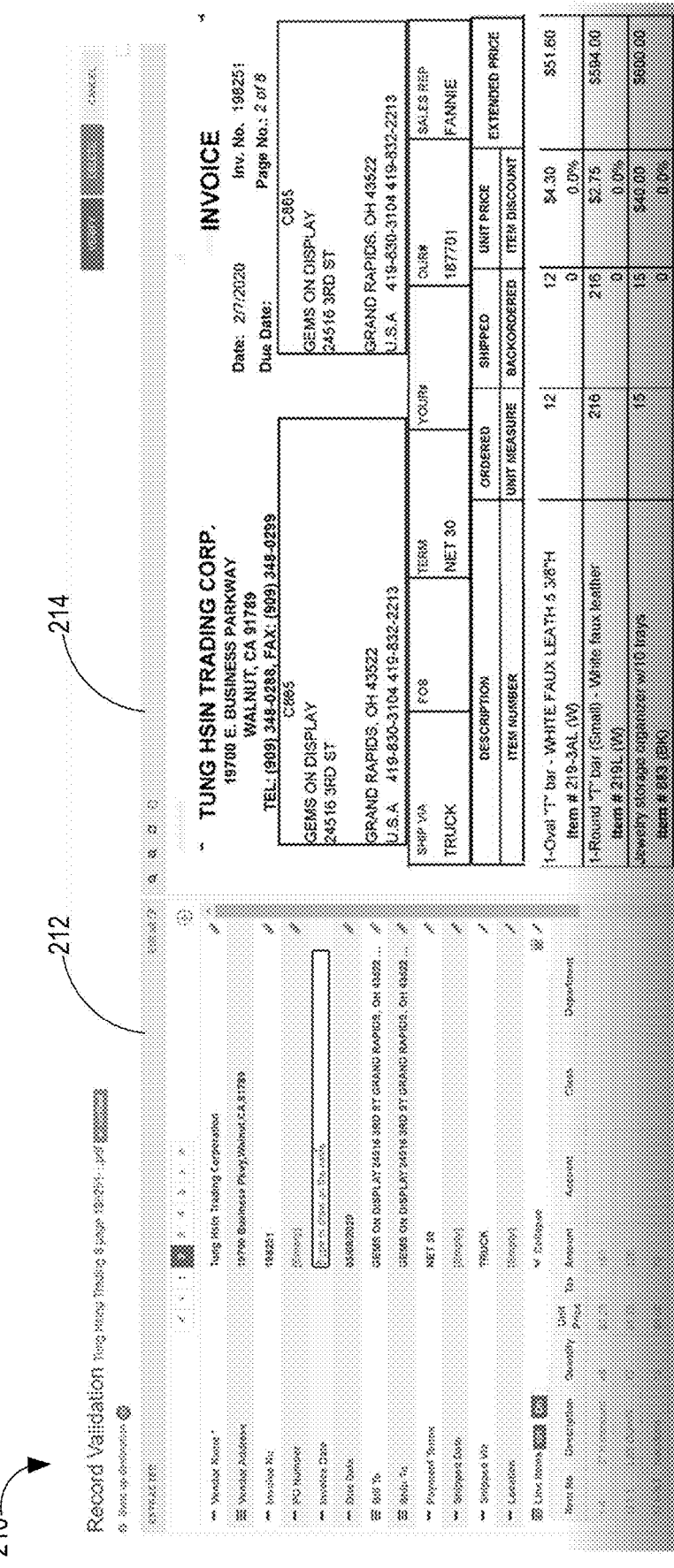
Figure 2B:
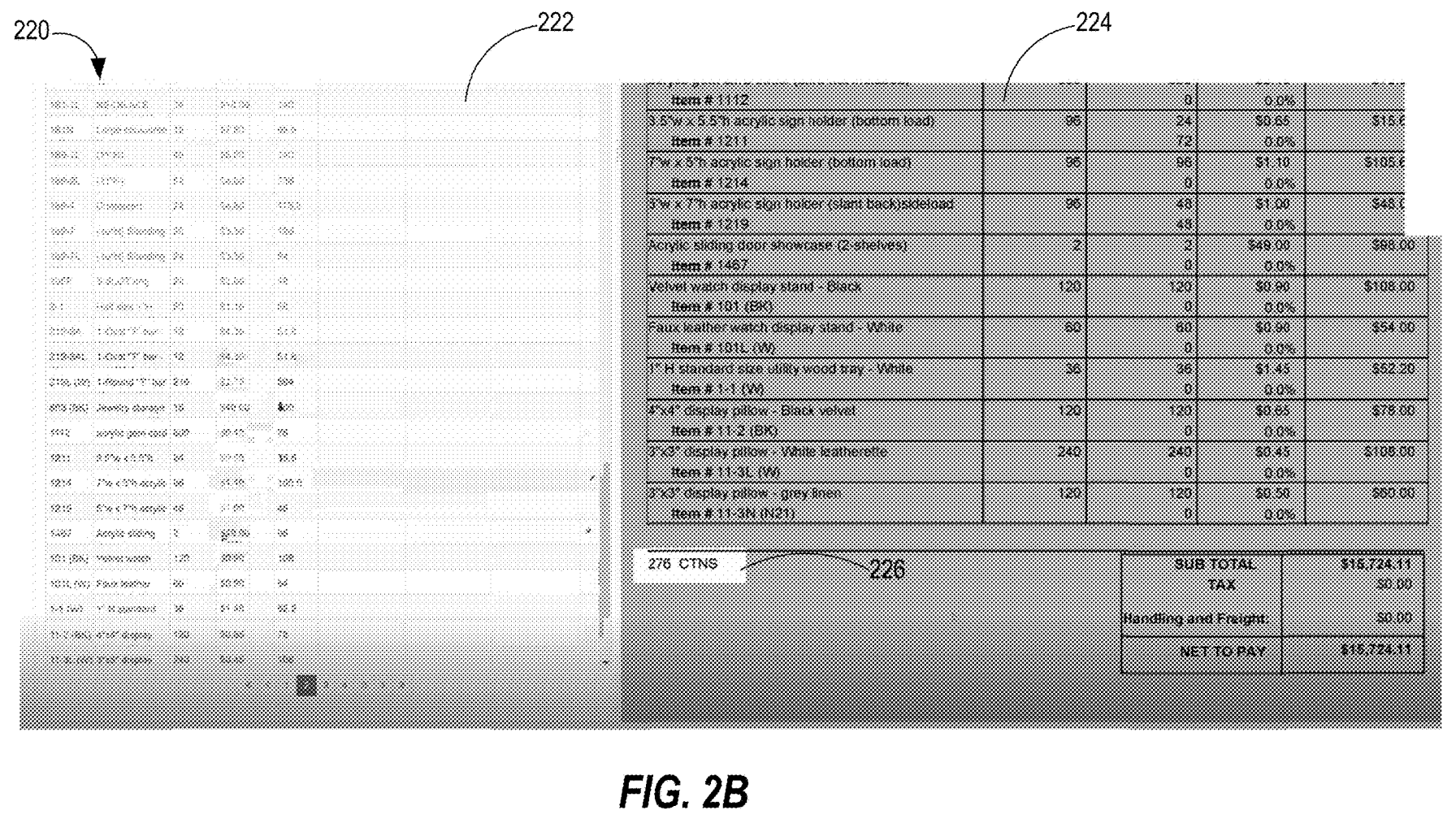
Figure 2C:
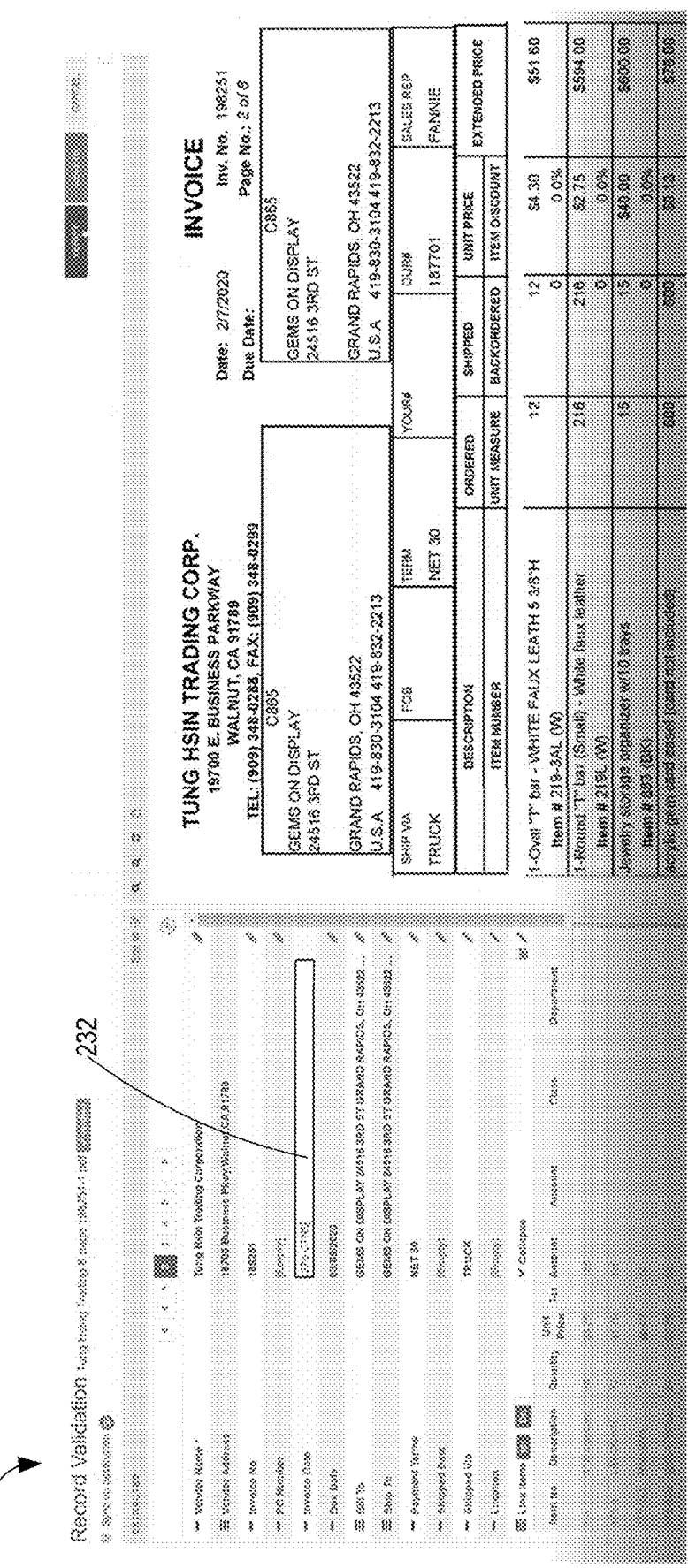

FIG. 2A-2C are screenshots of example user interfaces for displaying automatically extracted text data of an electronic document and performing regression with respect to the document format of the electronic document, in an embodiment. These example user interfaces are presented on a screen of a computing device, such as client device 110. While the computing device in the depicted example has a relatively large screen, embodiments are not so limited. For example, the computing device may be a smartphone. Thus, instead of the user making selections with a cursor control device, such as a mouse, the user of the computing device may make selections with his/her finger.

User interface 210 (of FIG. 2A) is generated in response to DDC 136 determining that the electronic document in question corresponds to a particular document format and selecting the corresponding parsing rule from parsing rule database 138, DEC 140 extracting text from the electronic document, and DEC 140 using the selected parsing rule to match extracted text data items to different field names. The parsing rule (or the data set associated with the parsing rule) and the extracted text are presented on user interface 210, which includes two sides: a data extraction side 212 and a document image side 214, the latter of which includes at least a portion of the rendered image that includes the document in question. Data extraction side 212 includes multiple field names (e.g., "Vendor Name," "Vendor Address," "Invoice No," "PO Number," "Invoice Date," "Due Date," and "Bill To") and multiple field values that correspond to at least some of the field names. Some field values read "Empty," indicating that nothing has been extracted from the corresponding image for the corresponding field name. For example, because DEC 140 did not detect a PO number, the field value for PO Number is "Empty."

In the depicted example, the text field for field value of the field name "Invoice Date" is blank. The field value may have read "Empty" prior to a user selecting the text field corresponding to the field value, causing the word "Empty" to disappear. Alternatively, the field value may have had a different value that was extracted from the document image. Thus, by the user selecting the field value, this indicates to IDP system 130 that the originally extracted value is incorrect. Whether the field value originally read "Empty" or had a different value, a user may type in a value manually (e.g., using a keyboard) or highlight a portion of the document image.

In an embodiment, manually-entered field values are visually distinguished from automatically-entered field values (e.g., using a parsing rule). Examples of visual distinguishing two different sets of text include using different colors, using different fonts, using different font sizes, and using emphasized font (e.g., bolded or italicized or underlined) versus non-emphasized font.

User interface 220 (of FIG. 2B) presents the two sides again, though labeled as data extraction side 222 (which corresponds to data extraction side 212) and document image side 224 (which corresponds to document image side 214). Thus, user interface 220 represents a scrolled down version (or lower portion) of user interface 210. In this example, while the user's cursor is in the text field corresponding to "Invoice Date," the user selects a portion 226 (e.g., using a cursor control device) of document image side 224. That portion includes the text "276 CTNS." This text may be determined by DEC 140 (or another component of IDP system 130) based on the locations of the selected portion, which locations may be four X-Y coordinates that, together, define the highlighted portion. DEC 140 uses those locations to identify text portions in output from OCR component 134, which text portions may be associated with spatial information that indicate where each extracted character or text string is located in the document. Because the user's cursor is in the text field corresponding to the field name "Invoice Date," that text field 232 is updated with the extracted text "276 CTNS," as indicated in user interface 230 in FIG. 2C.

Thereafter, DEC 140 (or another component of IDP system 130) updates the parsing rule that was used to parse and extract text from the electronic document to associate the field name "Invoice Date" with a particular location data in the document image. The particular location data may be spatial coordinates and/or relative positional information, such as where the extracted text is located relative to other text, such as known field names whose values have been extracted and/or extracted field values. The parsing rule is updated to include the particular location data for the corresponding field name.

This process of allowing a user to modify the parsing rule for a particular field name-value association by indicating a new location on an image of an electronic document after leveraging a parsing rule to parse and extract an electronic document is referred to herein as "regression."

Regression may be performed by the provider/representative of IDP system 130 or may be performed by a customer of (i.e., a user of the extraction and storage services provided by) IDP system 130. For example, a representative of IDP system 130 receives a document from a customer of IDP system 130. The representative may determine that IDP system 130 has not processed documents with the format of the document before, or at least does not recognize the format and, therefore, is unable to accurately extract field values from the document. The representative, operating a computing device that is communicatively coupled to IDP system 130, provides, through a user interface, input that associates selected portions of the document with certain field names. IDP system 130 records the associations between field names and locations of the selected portions as a parsing rule and stores the parsing rule in parsing rule database 138.

Thereafter, the representative (or the customer that provided the document) uploads a second document (of the same format) to IDP system 130 where DEC 140 selects the parsing rule and applies the parsing rule to the second document to extract text data from the second document. The representative (or the customer) verifies whether the extracted text data is accurate in that each extracted text data item corresponds to the appropriate field name and each field name that is expected to be associated with a field value is associated with the proper field value. If there any errors, then the representative (or the customer) provides input through the user interface to correct the errors, such as selecting a portion of an image of the second document and associating that portion with the appropriate field name (whether that field name was already associated with a field value or not).

V. LOCKING A PARSING RULE

After one or more regressions, a parsing rule for a document format may be considered relatively stable in that most, if not all, the requested field values are extracted and mapped to the appropriate field names. However, users of IDP system 130 may be unsophisticated and make changes to parsing rules, whether intentionally or unintentionally. Even intentional changes to a parsing rule may cause the parsing rule to degrade in performance over time. Therefore, embodiments allow a parsing rule to be unmodifiable.

In an embodiment, a parsing rule is "locked," meaning that the parsing rule cannot be updated. A locked parsing rule may, through user input, be unlocked later. Thus, a parsing rule may be in a locked state or an unlocked state. In a related embodiment, in response to a document format being verified by a user during a second or subsequent extraction of a document conforming to the document format, the corresponding parsing rule is locked. "Verification" may be IDP system 130 detecting that no changes to a parsing rule were made when the parsing rule was used a second time (or subsequent time).

Figure 3A:
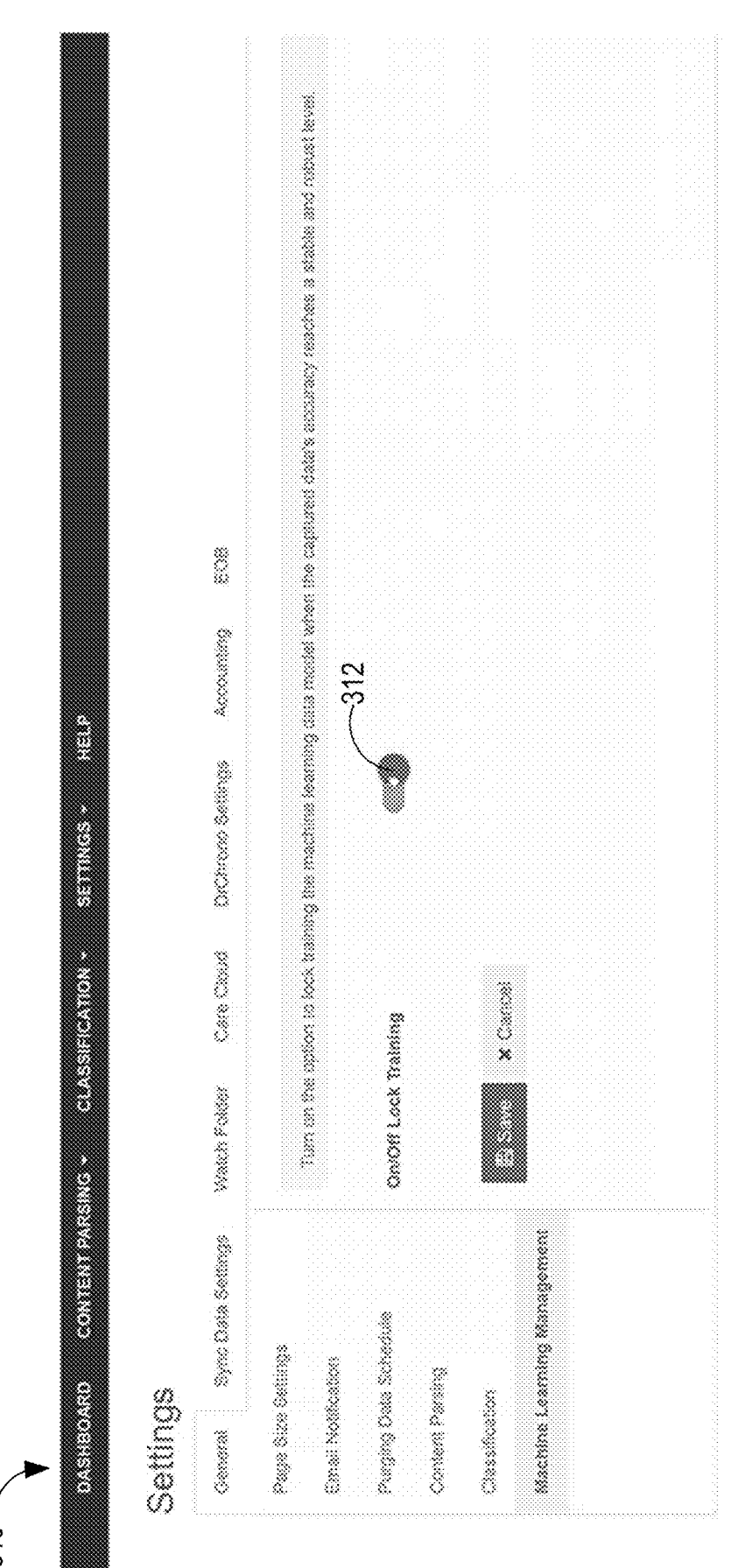
FIG. 3A is a screenshot of an example user interface that allows a user to manually "lock" a parsing rule, in an embodiment.

FIG. 3A is a screenshot of an example user interface 310 that allows a user to manually "lock" a parsing rule, in an embodiment. User interface 310 includes a lock toggle switch 312 that when selected, causes the locked state of the corresponding parsing rule to change, either from unlocked to locked, or from locked to unlocked.

Figure 3B:
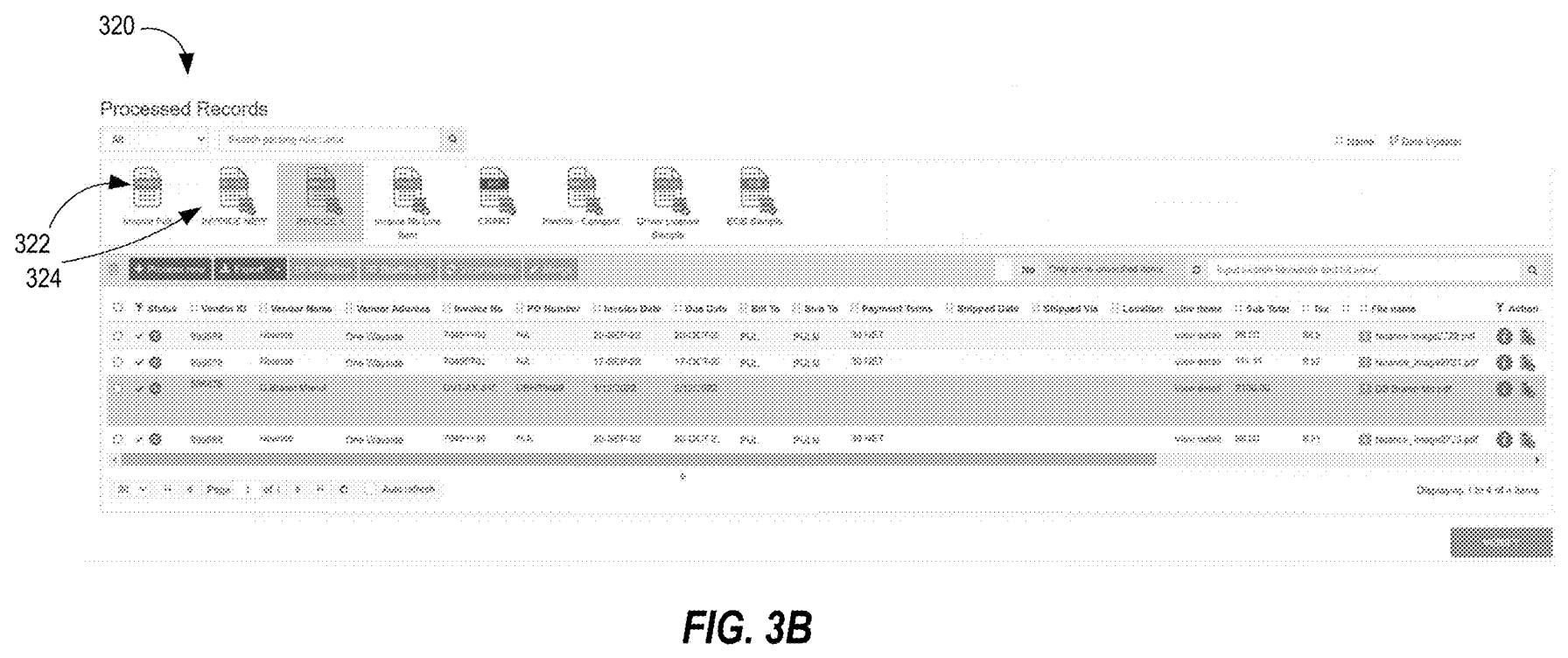

FIG. 3B is a screenshot of an example user interface 320 that presents indications of multiple document formats (or "form indicators") and an indication for each document format regarding whether that document format is locked, in an embodiment. In this example, eight form indicators are displayed. Seven of the eight are in a locked state (including document format 324, entitled "INVOICE NEW"), while one (document format 322, entitled "Invoice Full") is not. In this case, the icon indicating a locked state is a lock image that comprises three horizontal blue lines with a checkmark. The lock image is placed on the lower right-hand side of a form indicator (or image for a document format).

VI. NEW ENTITY

In some instances, an entity name (e.g., identifying the source of a document) extracted from an image of the document is used to identify a parsing rule (if one exists) in order to properly capture the extracted text of the document image. Even if a parsing rule does not exist for an entity, some of the extracted text data items may still be assigned to field names.

Figure 4:
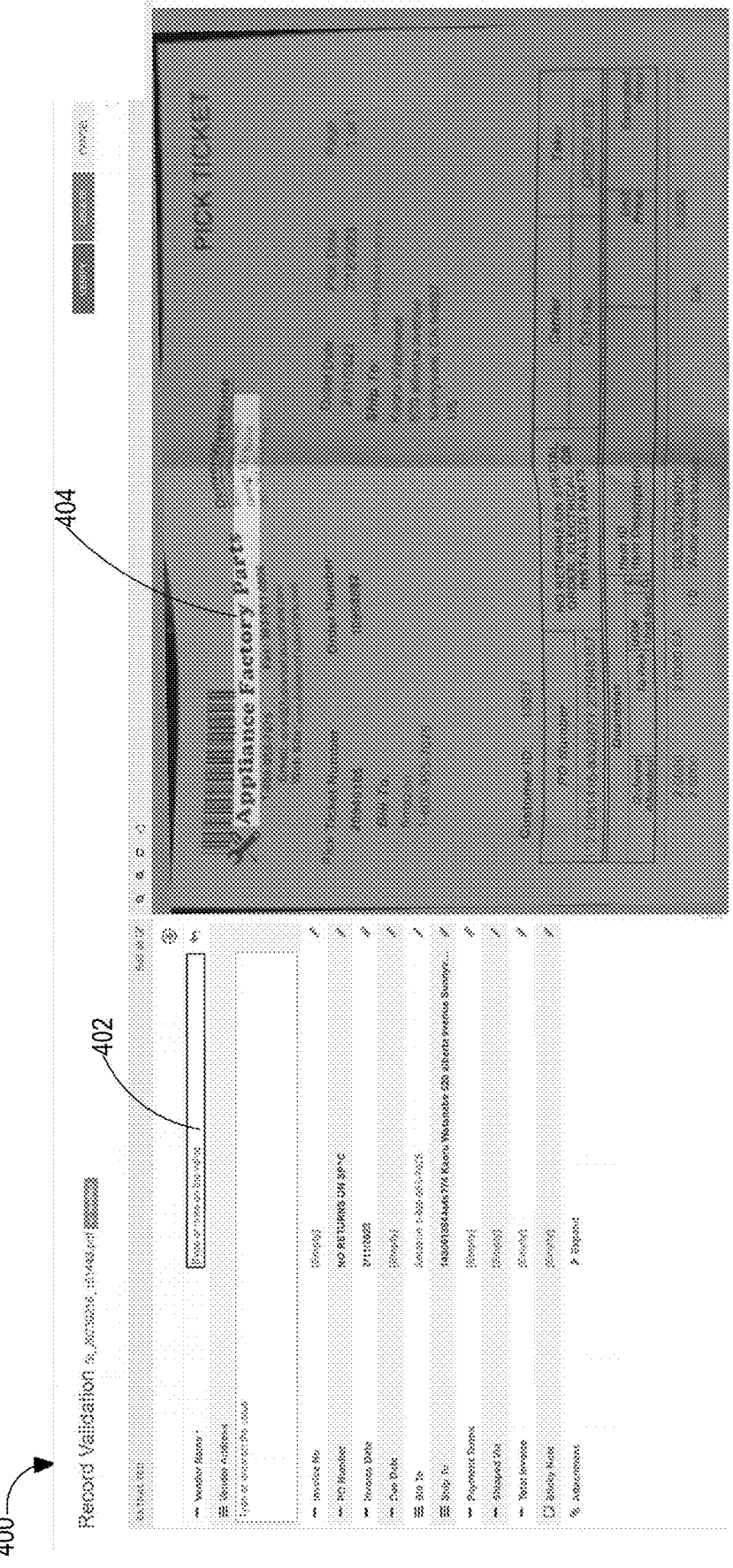
FIG. 4 is a screenshot of an example user interface for associating a parsing rule with an entity, in an embodiment.

FIG. 4 is a screenshot of an example user interface 400 for associating a parsing rule with an entity, in an embodiment. In this example, user interface 400 includes a portion of a document image and extracted text with corresponding field names. One field name is "Vendor Name." The vendor name might not have been extracted if the appropriate parsing rule has not yet been extracted. Nevertheless, DEC 140 is still able to recognize some field names in the extracted text (from an OCR operation) and assign (based on confidence scores) some of the extracted text data items in the extracted text to those field names. For example, "Invoice Date" is not found in the extracted text, but some parsing rules may use "Order Date" in place of "Invoice Date." Thus, "Order Date" may be considered a synonym of "Invoice Date." Also, DEC 140 determines that the text closest to the "Order Date" anchor text is a value for that field name and, therefore, includes that text in the text field associated with the field name "Invoice Date."

In the example of FIG. 4, text field 402 is empty, indicating that DEC 140 did not detect or recognize a vendor name in the extracted text. In the document image, while a cursor is in text field 402, the user draws a square over "Appliance Factory Parts." In response to this drawing, DEC 140 determines a location of the square in the document image, identifies a text string in the extracted text that matches that location, and inserts that text string in text field 402 (not shown). Thereafter, DEC 140 generates a parsing rule for that vendor, stores mappings of field names to locations of field values in the parsing rule, and stores the parsing rule in parsing rule database 138.

VII. SELECTING MULTIPLE VALUES

In some cases, it would be useful for a parsing rule to identify a set of multiple values (e.g., integers or real numbers) and perform an aggregation operation on the values in that set. Or, it would be helpful for a user to easily select multiple values and cause a certain aggregation operation to be performed so that the user does not have to perform the calculation manually. Example aggregation operations include sum, mean, median min, and max.

Figure 5A:
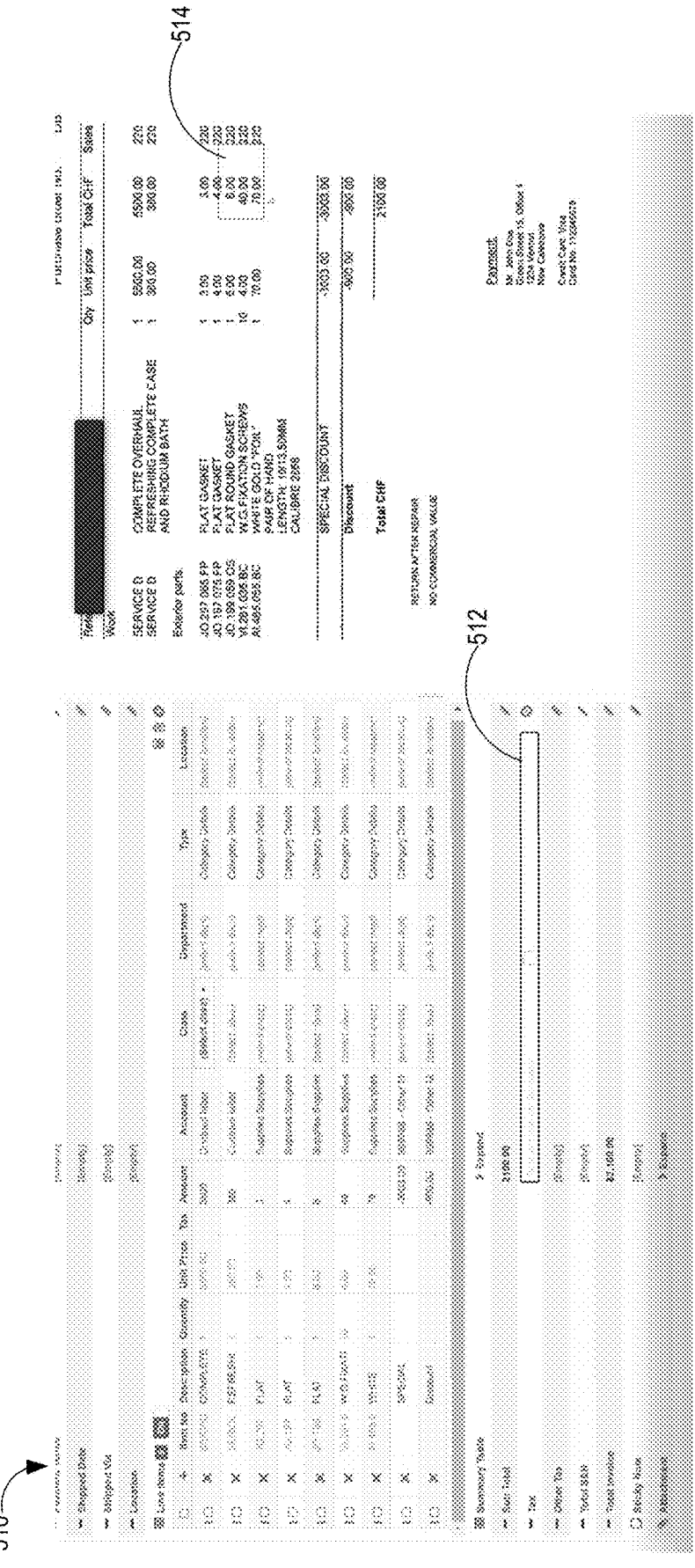
Figure 5B:
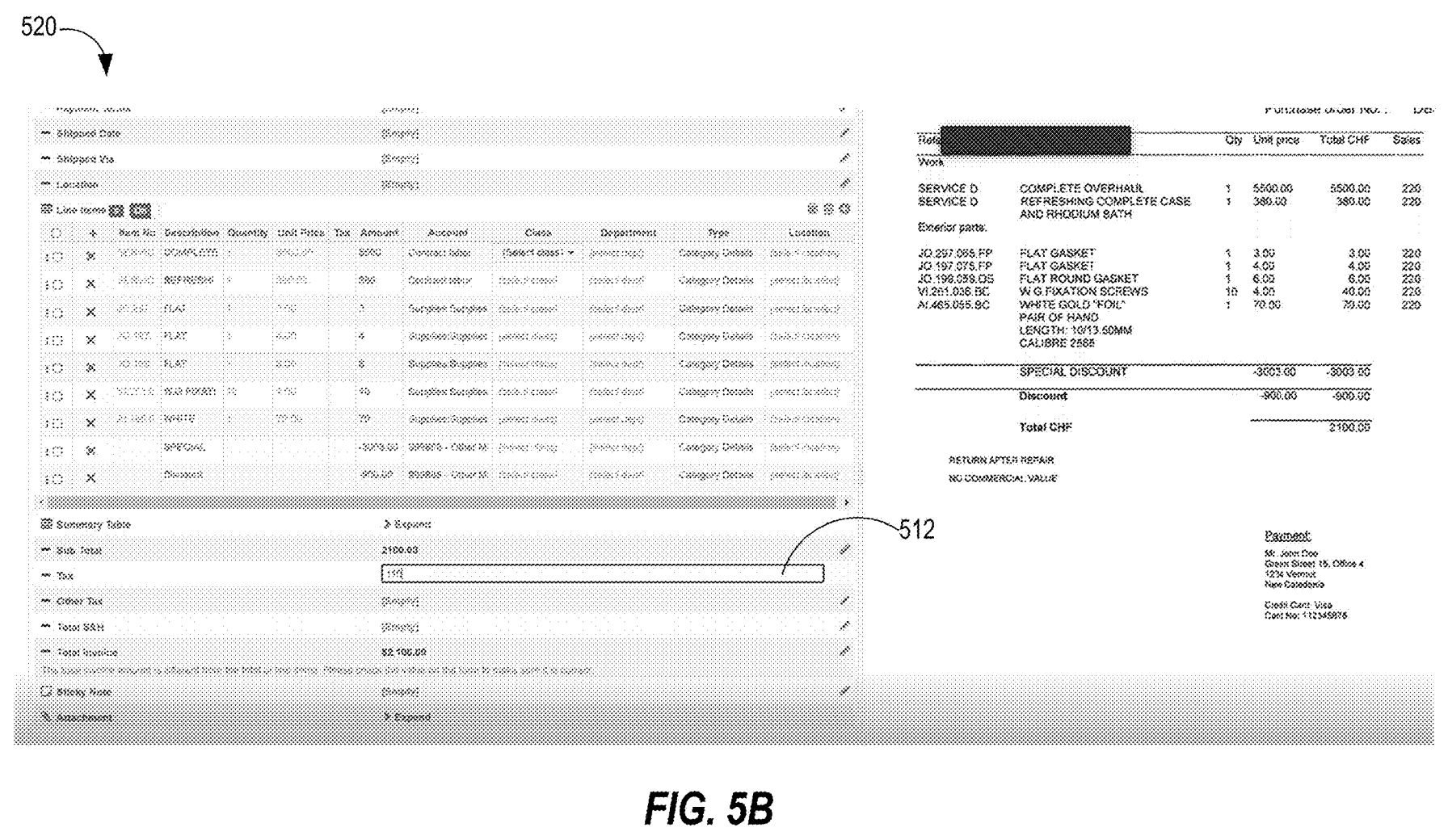

FIG. 5A is a screenshot of an example user interface 510 that allows a user to select multiple values in a document and cause IDP system 130 (or an application executing on client device 110) to perform an aggregation operation on the selected values, in an embodiment. User interface 510 includes an image of a document and a text entry field 512 that allows a user to enter a value for field name "Tax." While (or immediately after) the user's cursor is in text entry field 512, the user selects a portion 514 of the document image. Portion 514 includes three values. The selection of portion 514 may be using certain key combinations (such as Alt+b or Shift+Alt+b). IDP system 130 (or the application executing on client device 110) sums the three values and inserts the sum in text entry field 512, as indicated in user interface 520 (depicted in FIG. 5B).

In other cases, it would be useful for a parsing rule to identify a set of multiple values and insert them in different text entry fields. Or, it would be helpful for a user to easily select multiple values and cause the selected values to be inserted into different text entry fields automatically so that the user does not have to select each value separately.

Figure 5C:
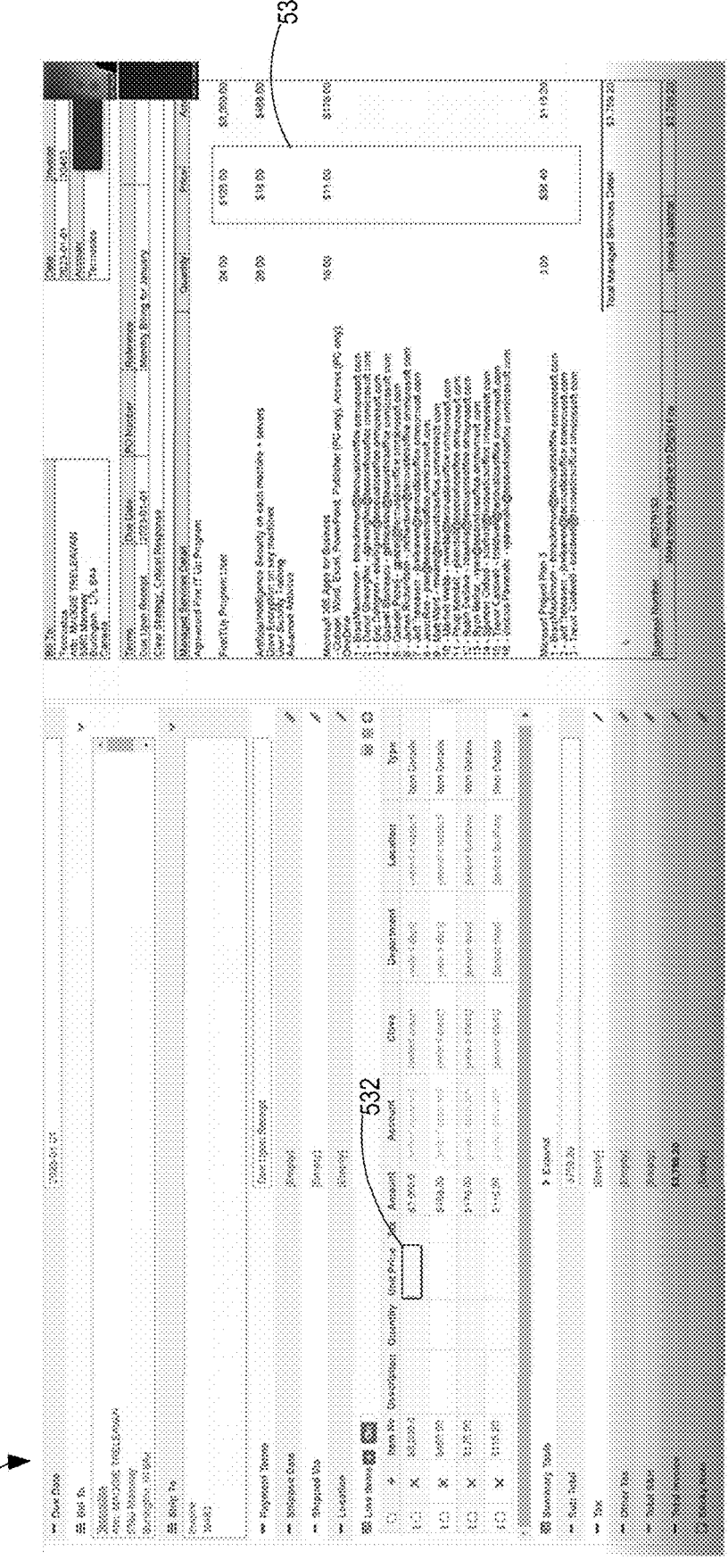
FIGS. 5C-5D are screenshots of example user interfaces that allow a user to select multiple values in a document and cause a system to automatically insert those values into different text entry fields corresponding to a field name, in an embodiment.
Figure 5D:
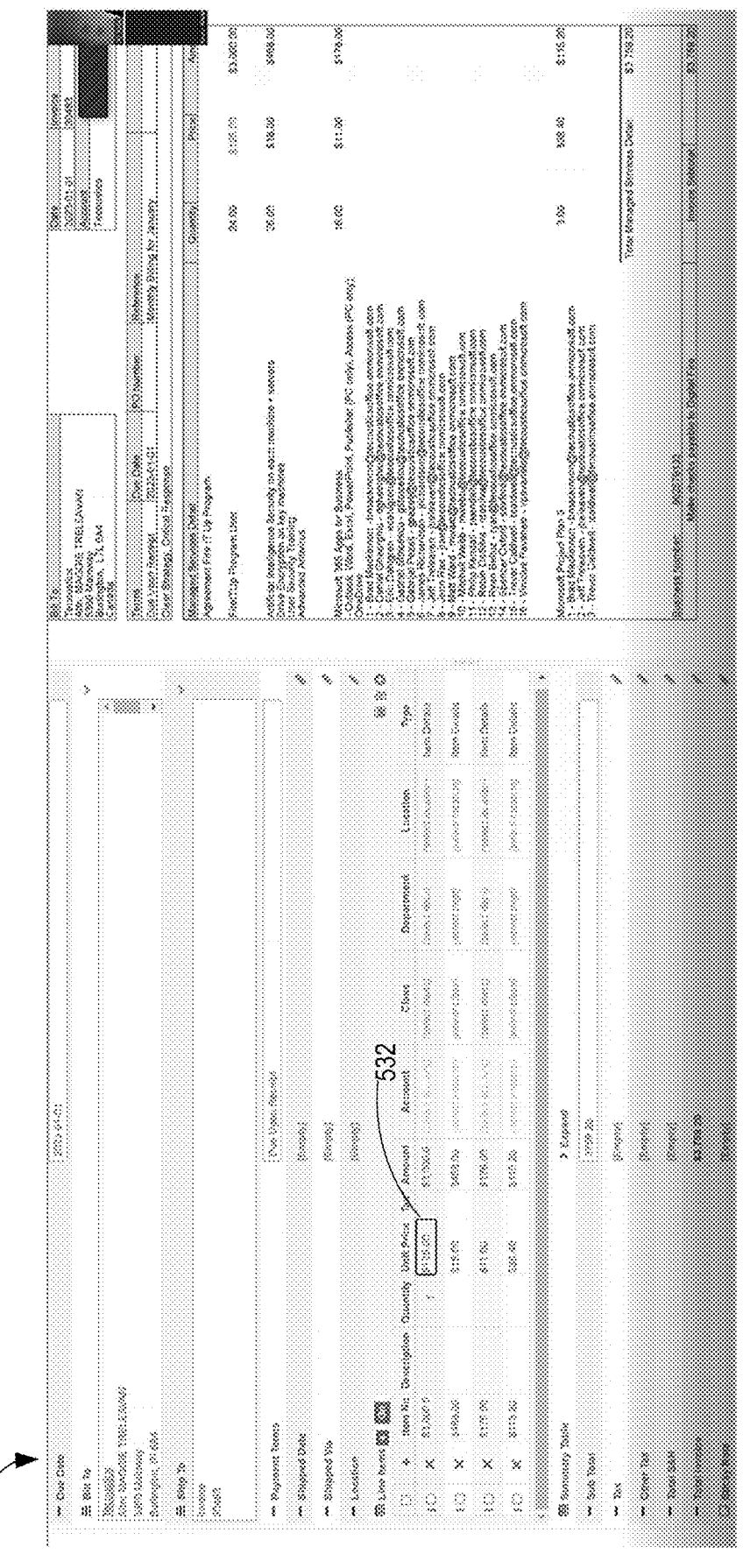

FIG. 5C is a screenshot of an example user interface 530 that allows a user to select multiple values in a document and cause IDP system 130 to automatically insert those values into different text entry fields corresponding to a field name, in an embodiment. User interface 530 includes an image of a document and a text entry field 532 that allows a user to enter a value for field name "Unit Price," which is a sub-field name of field name "Line Items." While (or immediately after) the user's cursor is in text entry field 532, the user selects a portion 534 of the document image. Portion 534 includes four values. The selection of portion 534 may be using certain key combinations (such as Ctrl+Alt+c or Alt+c). IDP system 130 (or the application executing on client device 110) inserts the four values into different text entry fields all of the same sub-field name as "Unit Price," as indicated in user interface 540 (depicted in FIG. 5D). User interface 540 is updated to include: in the first text entry field (532) under "Unit Price," the first value of the four selected values; in the second text entry field under "Unit Price," the second value of the four selected values; and so forth.

VIII. EXAMPLE PROCESS

FIG. 6 is a flow diagram that depicts an example process 600 for processing an electronic document, in an embodiment. Process 600 may be performed by one or more components of IDP system 130 and, optionally, one or more end-user computing devices (e.g., client device 110).

At block 610, multiple parsing rules are stored in a parsing rule database (e.g., parsing rule database 138). Each parsing rule is used to extract values from a document (or form) of an entity of multiple entities. Also, each parsing rule corresponds to a different entity of the multiple entities.

At block 620, a request to use a parsing rule, in the plurality of parsing rules, is received for a particular document. Block 620 may involve receiving component 132 receiving the request from client device 110. The user of client device 110 may be a customer of IDP system 130 or a representative thereof. The request may include the particular document or a reference to the particular document. The request might not include any reference to which parsing rule to use. However, the request might include a reference to a source entity of the particular document.

At block 630, in response to receiving the request, a particular parsing rule is selected for parsing the particular document. Block 630 may involve determining an identity of the source entity, which identity is used to select the particular parsing rule. Block 630 may further involve OCR component 134 extracting text from the particular document and using a portion of the extracted text to identify the source entity. Alternatively, block 630 may involve comparing one or more text strings extracted from the particular document with known entity names, which, if there is a match, then the parsing rule associated with the matched entity name is selected.

At block 640, extracted text from the particular document is parsed using the particular parsing rule. Block 640 may involve DEC 140 mapping some of the text data items in the extracted text to field names indicated in the parsing rule. Block 640 may also involve presenting at least a portion of the mapping on a screen of a computing device, such as client device 110.

At block 650, first input is received that selects data associated with a particular field name that is associated with the particular document. The first input may be received through a graphical user interface that is presented on the screen of the computing device. Block 650 may involve selecting, with a cursor control device or with the user's finger on a touchscreen, a text field entry that is associated with the particular field name.

At block 660, second input is received that selects a visual portion of the particular document. Again, the second input may be received through the graphical user interface. Block 660 may involve selecting, with a cursor control device or with the user's finger on a touchscreen, an area of the presented portion of the particular document. Prior to block 660, the user may have provided input to move a view of the particular document, in case the entirety of the particular document cannot be presented on the screen simultaneously.

At block 670, the particular parsing rule is updated based on the first input and the second input to generate an updated parsing rule. Block 670 may involve associating, in the parsing rule, the particular field name with location data indicating a location of the selected visual portion. The location data may be logical location data and/or actual location data, such as certain pixel offsets from a fixed point in the document.

Block 670 may further involve replacing the particular parsing rule, in the parsing rule database, with the updated parsing rule. Such "replacing" may involve deleting the old version of the parsing rule in the parsing rule database and inserting the new/updated version of the parsing rule. Alternatively, such "replacing" may involve inserting just the new association in the parsing rule in the parsing rule database.

IX. IMPLEMENTATION MECHANISMS

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
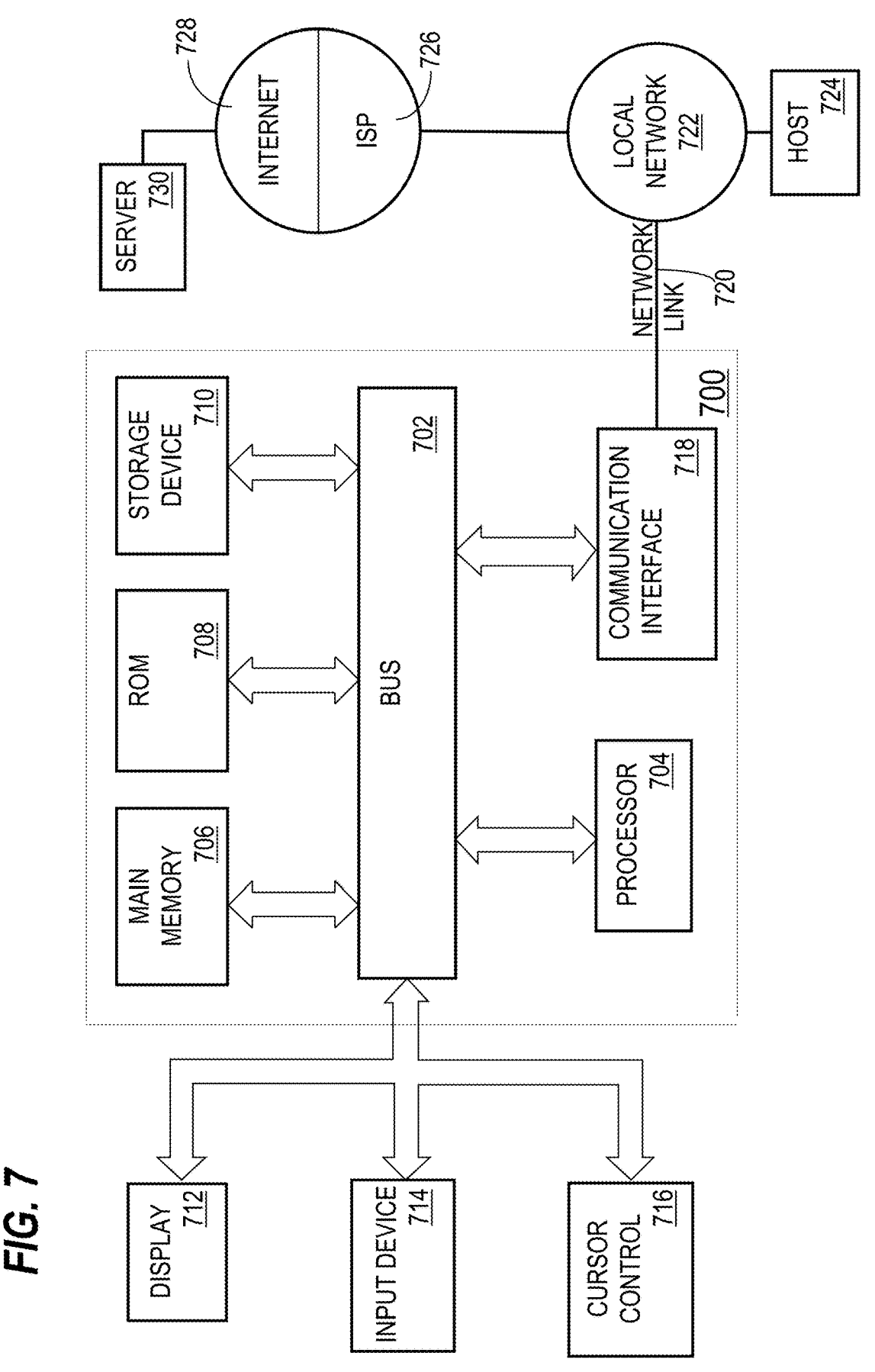
FIG. 7 is a block diagram that depicts an example computer system upon which embodiments of the invention may be implemented.

FIG. 7 is a block diagram that depicts an example computer system 700 upon which embodiments of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. Although bus 702 is illustrated as a single bus, bus 702 may comprise one or more buses. For example, bus 702 may include without limitation a control bus by which processor 704 controls other devices within computer system 700, an address bus by which processor 704 specifies memory locations of instructions for execution, or any other type of bus for transferring data or signals between components of computer system 700.

An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic or computer software which, in combination with the computer system, causes or programs computer system 700 to be a special-purpose machine. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operate in a specific manner. In an embodiment implemented using computer system 700, various computer-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
one or more processors;
one or more storage media storing instructions which, when executed by the one or more processors, cause:
storing, in a parsing rule database, a plurality of parsing rules, wherein each parsing rule in the plurality of parsing rules is used to map field values in extracted text to field names associated with said each parsing rule;
receiving a request to use a parsing rule, in the plurality of parsing rules, for a particular document;
in response to receiving the request, selecting a particular parsing rule from among the plurality of parsing rules;

extracting text data associated with the particular document;
using the particular parsing rule to map a plurality of field values in the text data to a plurality of field names associated with the particular parsing rule;
receiving first input that selects data associated with a particular field name of the plurality of field names;
receiving second input that selects a visual portion of the particular document;
updating the particular parsing rule based on the first input and the second input to generate an updated parsing rule;
after updating the particular parsing rule:
receiving a second request to use a parsing rule, in the plurality of parsing rules, for a second document;
in response to receiving the second request, selecting the updated parsing rule;
extracting second text data associated with the second document;
using the updated parsing rule to map a second plurality of field values in the second text data to the plurality of field names associated with the updated parsing rule.

2. The apparatus of claim 1, wherein the instructions, when executed by the one or more processors, further cause:
receiving third input that selects a locking option for the updated parsing rule;
wherein, while the locking option is user selected for the updated parsing rule, changes to the updated parsing rule are not allowed.

3. The apparatus of claim 1, wherein the instructions, when executed by the one or more processors, further cause:
causing a plurality of form indicators to be presented on a screen of a computing device, each form indicator in the plurality of form indicators corresponding to a different document format of multiple document formats;
causing a lock image to be displayed adjacent to each form indicator, of the plurality of form indicators, that is associated with the lock option.

4. The apparatus of claim 1, wherein:
each parsing rule in the plurality of parsing rules corresponds to a different entity of a plurality of entities;
selecting the particular parsing rule comprises:
identifying a particular entity that is associated with the particular document;
selecting the particular parsing rule based on an identity of the particular entity.

5. The apparatus of claim 1, wherein:
the particular parsing rule comprises a plurality of field value-location associations, each of which associates a field value, of a field name, with a location within documents of the same format as the particular document;
updating the particular parsing rule comprises modifying a particular field value-location association of the plurality of field value-location associations;
modifying the particular field value-location association comprises modifying location data of the particular field value-location association based on a location of the visual portion.

6. The apparatus of claim 5, wherein the location data indicates (a) a logical location of the particular field value relative to one or more other field names of the particular document or (b) an actual location within the particular document.

7. Apparatus of claim 1, wherein the instructions, when executed by the one or more processors, further cause:

in response to receiving a new document, performing an optical character recognition (OCR) operation on the new document to extract a first plurality of field names and a first plurality of field values;

determining that no entity in a set of entities is not detected for the new document;

in response to receiving input that selects a portion of the new document, identifying a text string in the portion and storing the text string as entity identification data for the new document;

generating a new parsing rule for the new document;

updating the parsing rule database to include the new parsing rule.

8. The apparatus of claim 1, wherein:

a first subset of the plurality of parsing rules comprises multiple parsing rules that are for associating field values with field names from documents of a first document type;

a second subset of the plurality of parsing rules comprises multiple parsing rules that are for associating field values with field names from documents of a second document type that is different than the first document type.

9. The apparatus of claim 1, wherein the instructions, when executed by the one or more processors, further cause, prior to receiving the first input:

causing to be presented, on a screen of a computing device, a subset of the plurality of field names of the particular document and a subset of the plurality of field values that were extracted from the particular document using the particular parsing rule.

10. The apparatus of claim 9, wherein:

one or more first field values of the plurality of field values have a first visual representation based on the one or more first field values being automatically mapped to one or more first field names using the particular parsing rule;

one or more second field values of the plurality of field values have a second visual representation, that is different than the first visual representation, based on the one or more second field values being mapped to one or more second field names based on user input.

11. The apparatus of claim 1, wherein the instructions, when executed by the one or more processors, further cause:

receiving third input that selects second data associated with a second field name of the plurality of field names;

while the second data is selected, receiving fourth input that selects a second visual portion of the particular document, wherein the second visual portion includes a plurality of numerical values;

in response to receiving the fourth input, aggregating the plurality of numerical values to generate a total value;

causing the total value to be presented in association with the second data.

12. One or more non-transitory storage media storing instructions which, when executed by one or more processors, cause:

storing, in a parsing rule database, a plurality of parsing rules, wherein each parsing rule in the plurality of parsing rules is used to map field values in extracted text to field names associated with said each parsing rule;

receiving a request to use a parsing rule, in the plurality of parsing rules, for a particular document;

in response to receiving the request, selecting a particular parsing rule from among the plurality of parsing rules;

extracting text data associated with the particular document;

using the particular parsing rule to map a plurality of field values in the text data to a plurality of field names associated with the particular parsing rule;

receiving first input that selects data associated with a particular field name of the plurality of field names;

receiving second input that selects a visual portion of the particular document;

updating the particular parsing rule based on the first input and the second input to generate an updated parsing rule;

after updating the particular parsing rule:

receiving a second request to use a parsing rule, in the plurality of parsing rules, for a second document;

in response to receiving the second request, selecting the updated parsing rule;

extracting second text data associated with the second document;

using the updated parsing rule to map a second plurality of field values in the second text data to the plurality of field names associated with the updated parsing rule.

13. The one or more storage media of claim 12, wherein the instructions, when executed by the one or more processors, further cause:

receiving third input that selects a locking option for the updated parsing rule;

wherein, while the locking option is user selected for the updated parsing rule, changes to the updated parsing rule are not allowed.

14. The one or more storage media of claim 12, wherein the instructions, when executed by the one or more processors, further cause:

causing a plurality of form indicators to be presented on a screen of a computing device, each form indicator in the plurality of form indicators corresponding to a different document format of multiple document formats;

causing a lock image to be displayed adjacent to each form indicator, of the plurality of form indicators, that is associated with the lock option.

15. The one or more storage media of claim 12, wherein:

each parsing rule in the plurality of parsing rules corresponds to a different entity of a plurality of entities;

selecting the particular parsing rule comprises:

identifying a particular entity that is associated with the particular document;

selecting the particular parsing rule based on an identity of the particular entity.

16. The one or more storage media of claim 12, wherein:

the particular parsing rule comprises a plurality of field value-location associations, each of which associates a field value, of a field name, with a location within documents of the same format as the particular document;

updating the particular parsing rule comprises modifying a particular field value-location association of the plurality of field value-location associations;

modifying the particular field value-location association comprises modifying location data of the particular field value-location association based on a location of the visual portion.

17. The one or more storage media of claim 12, wherein the instructions, when executed by the one or more processors, further cause:

in response to receiving a new document, performing an optical character recognition (OCR) operation on the new document to extract a first plurality of field names and a first plurality of field values;

determining that no entity in a set of entities is not detected for the new document;

in response to receiving input that selects a portion of the new document, identifying a text string in the portion and storing the text string as entity identification data for the new document;

generating a new parsing rule for the new document;

updating the parsing rule database to include the new parsing rule.

18. The one or more storage media of claim 12, wherein:

a first subset of the plurality of parsing rules comprises multiple parsing rules that are for associating field values with field names from documents of a first document type;

a second subset of the plurality of parsing rules comprises multiple parsing rules that are for associating field values with field names from documents of a second document type that is different than the first document type.

19. The one or more storage media of claim 12, wherein the instructions, when executed by the one or more processors, further cause, prior to receiving the first input:

causing to be presented, on a screen of a computing device, a subset of the plurality of field names of the particular document and a subset of the plurality of field values that were extracted from the particular document using the particular parsing rule.

20. The one or more storage media of claim 12, wherein the instructions, when executed by the one or more processors, further cause:

receiving third input that selects second data associated with a second field name of the plurality of field names;

while the second data is selected, receiving fourth input that selects a second visual portion of the particular document, wherein the second visual portion includes a plurality of numerical values;

in response to receiving the fourth input, aggregating the plurality of numerical values to generate a total value;

causing the total value to be presented in association with the second data.

\* \* \* \* \*